United States Patent
Hood et al.

(10) Patent No.: US 9,633,637 B1
(45) Date of Patent: Apr. 25, 2017

(54) MAGNETIC RESONANCE TUNING DEVICE FOR STRINGED INSTRUMENTS

(71) Applicant: Hood World Productions, LLC, Nashville, TN (US)

(72) Inventors: Eric Hood, Nashville, TN (US); Thomas Korber Hall, Kingston Springs, TN (US)

(73) Assignee: Hood World Productions, LLC, Nashville, TN (US)

( * ) Notice: Subject to any disclaimer, the term of this patent is extended or adjusted under 35 U.S.C. 154(b) by 0 days.

(21) Appl. No.: 14/747,761

(22) Filed: Jun. 23, 2015

Related U.S. Application Data

(60) Provisional application No. 62/104,957, filed on Jan. 19, 2015.

(51) Int. Cl.
  *G10H 3/18* (2006.01)
  *G10G 7/02* (2006.01)
  *G10D 3/14* (2006.01)

(52) U.S. Cl.
  CPC .............. *G10G 7/02* (2013.01); *G10D 3/14* (2013.01)

(58) Field of Classification Search
  CPC .................................. G10G 7/02; G10D 3/14
  USPC .................................................. 84/726–728
  See application file for complete search history.

(56) References Cited

U.S. PATENT DOCUMENTS

| | | | |
|---|---|---|---|
| 3,675,529 A | 7/1972 | Van Der Woerd | |
| 4,050,341 A | 9/1977 | Underwood | |
| 4,120,229 A * | 10/1978 | Ota | G10H 1/44 324/76.44 |
| 4,253,374 A * | 3/1981 | Watterman | G10G 7/02 84/455 |
| 4,297,938 A | 11/1981 | Kirby | |
| 4,320,689 A * | 3/1982 | Pogoda | G10G 7/02 84/320 |
| 4,351,216 A | 9/1982 | Hamm | |
| 4,369,687 A | 1/1983 | Meyers | |
| 4,909,126 A | 3/1990 | Skinn et al. | |
| 5,038,657 A | 8/1991 | Busley | |
| 5,343,793 A * | 9/1994 | Pattie | G10D 3/14 84/297 R |
| 5,637,820 A * | 6/1997 | Wittman | G10D 1/085 84/327 |
| 5,767,429 A * | 6/1998 | Milano | G10G 7/02 84/297 R |
| 5,824,937 A | 10/1998 | Szalay | |
| 5,854,437 A * | 12/1998 | Merrick | G10G 7/02 84/454 |
| 5,877,444 A * | 3/1999 | Hine | G10G 7/02 84/454 |
| 5,883,323 A | 3/1999 | Kaufman | |
| 5,936,179 A | 8/1999 | Merrick et al. | |

(Continued)

*Primary Examiner* — Jeffrey Donels
(74) *Attorney, Agent, or Firm* — Waller Lansden Dortch & Davis, LLP; Blake M. Bernard; Mark A. Pitchford

(57) ABSTRACT

A tuning device and method for tuning or verifying the tuning of a string of a stringed instrument is provided. The device includes an electromagnetic pickup physically separate from the stringed instrument. The electromagnetic pickup is a noise cancelling pickup. The electromagnetic pickup ultimately provides an electrical signal indicative of a movement of the string in a magnetic field of the electromagnetic pickup to a processor electronic tuner. Optional features of the electromagnetic pickup increase the effective range of the pickup.

17 Claims, 11 Drawing Sheets

(56) References Cited

U.S. PATENT DOCUMENTS

| | | | |
|---|---|---|---|
| 6,184,452 B1 * | 2/2001 | Long | G10D 3/14 84/457 |
| 6,479,738 B1 | 11/2002 | Gilmore | |
| 6,559,369 B1 | 5/2003 | Gilmore | |
| 7,265,282 B2 * | 9/2007 | Membreno | G10G 7/02 84/453 |
| 7,390,951 B2 * | 6/2008 | Dulaney | G10G 7/02 84/454 |
| 7,763,789 B2 | 7/2010 | Clark | |
| 8,334,449 B2 | 12/2012 | Nielsen et al. | |
| 2009/0288547 A1 | 11/2009 | Lazovic | |
| 2012/0279380 A1 * | 11/2012 | Ashdown | G10D 3/006 84/454 |
| 2014/0060289 A1 * | 3/2014 | Hirshberg | G10H 5/00 84/654 |
| 2015/0059562 A1 * | 3/2015 | Burmas | G10H 1/44 84/742 |

* cited by examiner

MAGNETIC RESONANCE TUNING DEVICE FOR STRINGED INSTRUMENTS

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims priority to and hereby incorporates by reference in its entirety U.S. Provisional Patent Application Ser. No. 62/104,957 filed on Jan. 19, 2015 and entitled "MAGNETIC RESONANCE TUNING DEVICE."

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to guitar tuning systems and methods. More particularly, this invention pertains to tuning guitars in acoustically noisy environments.

Musical performers often use a number of different guitars, some with different tunings in an extended show. Guitar technicians are responsible for setting up and tuning those guitars for performers before warm-up sessions and between warm-up sessions and when the guitar is used for a performance. One guitar technician is typically responsible for a number of guitars for different performers in a performing group or band. Warm-up sessions are often conducted while the stage and stage show equipment are being rigged (i.e., set up). Therefore, tuning must typically be done in an acoustically noisy environment. Checking tuning prior to handing a guitar to a performer on stage is even more complicated because the performers are typically playing a song at a high volume level. This distorts tuning with traditional acoustic tuners, often making tuning or checking tuning acoustically impossible. If the guitar has magnetic pickups, then the problem can be overcome by plugging the guitar audio output into an input jack of a compatible tuner. However, many acoustic guitars do not have pickups, and tuning cannot be verified with a tuner in such a noisy environment. Additionally, plugging in and unplugging a number of guitars to check tuning introduces an undesirable delay in changing out guitars for performers on stage.

BRIEF SUMMARY OF THE INVENTION

Aspects of the present invention provide a tuning device for stringed instruments that relies on a magnetic connection instead of an electrical or acoustic connection.

In one aspect, a tuning device for a stringed instrument includes an electromagnetic pickup and an output connector. The electromagnetic pickup is separate from the stringed instrument. The electromagnetic pickup has a magnetic field. The output connector is configured to provide an electrical signal indicative of a movement of a string of the stringed instrument within the magnetic field of the electromagnetic pickup.

In another aspect, attending device for a stringed instrument includes electromagnetic pickup, a processor, and a display. Electromagnetic pickup is separate from the stringed instrument. The electromagnetic pickup has a magnetic field and is configured to provide an electrical signal indicative of a movement of a string of the stringed instrument within the magnetic field. The processor is configured to receive the electrical signal provided by the electromagnetic pickup, determine a frequency of the electrical signal, and determine a frequency of the electrical signal. The display is configured to receive the frequency of the electrical signal from the processor and provide a visual indicator of the frequency of the electrical signal.

In another aspect, a method of verifying a tuning of a stringed instrument includes positioning the stringed instrument such that a string of the stringed instrument is within 6 inches of an electromagnetic pickup of a tuning device. The electromagnetic pickup is not attached to the stringed instrument. The method also includes picking the string of the stringed instrument. An operator then reads a visual indicator of a frequency of the string from a display associated with the tuning device. The operator can then adjust the tuning of the string as necessary.

BRIEF DESCRIPTION OF THE SEVERAL VIEWS OF THE DRAWINGS

Reference will now be made in detail to optional embodiments of the invention, examples of which are illustrated in accompanying drawings. Whenever possible, the same reference numbers are used in the drawing and in the description referring to the same or like parts.

DETAILED DESCRIPTION OF THE INVENTION

Figure 1:
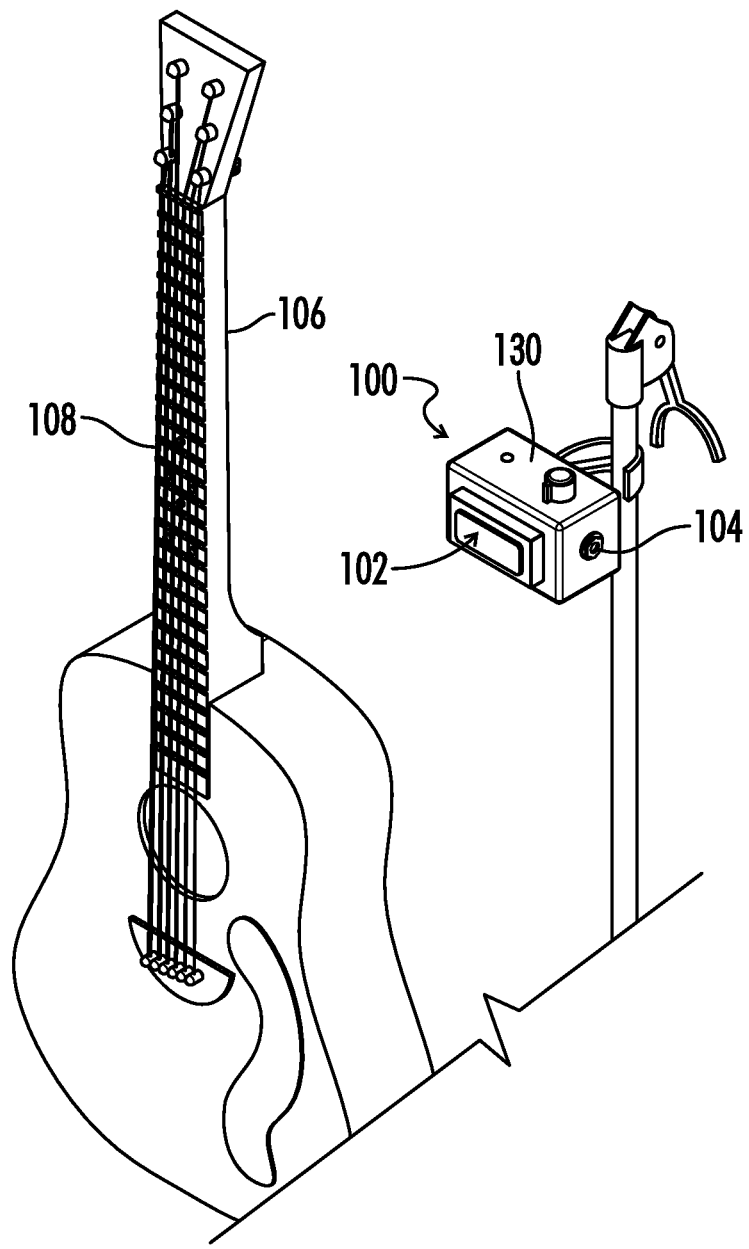
FIG. 1 is an isometric view of a tuning device for a stringed instrument.
Figure 2:
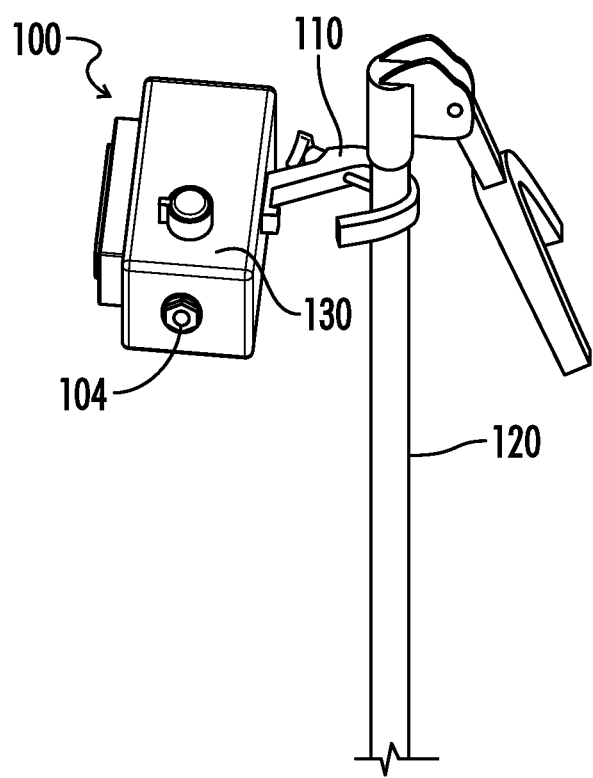
FIG. 2 is an isometric view of a tuning device mounted to a pole.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

As described herein, an upright position is considered to be the position of apparatus components while in proper operation or in a natural resting position as described herein. Vertical, horizontal, above, below, side, top, bottom and other orientation terms are described with respect to this upright position during operation unless otherwise specified. The term "when" is used to specify orientation for relative positions of components, not as a temporal limitation of the claims or apparatus described and claimed herein unless otherwise specified. The terms "above", "below", "over", and "under" mean "having an elevation or vertical height greater or lesser than" and are not intended to imply that one object or component is directly over or under another object or component.

The phrase "in one embodiment," as used herein does not necessarily refer to the same embodiment, although it may. Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The terms "coupled" and "connected" mean at least either a direct electrical connection between the connected items or an indirect connection through one or more passive or active intermediary devices.

The term "circuit" means at least either a single component or a multiplicity of components, either active and/or passive, that are coupled together to provide a desired function.

Terms such as "providing," "processing," "supplying," "determining," "calculating" or the like may refer at least to an action of a computer system, computer program, signal processor, logic or alternative analog or digital electronic device that may be transformative of signals represented as physical quantities, whether automatically or manually initiated.

Referring to FIGS. 1-6, a tuning device 100 for a stringed instrument 106 including an electromagnetic pickup 102 and an output connector 104. The electromagnetic pickup 102 is separate from the stringed instrument 106. That is, the electromagnetic pickup 102 of the tuning device 100 is not physically connected to the stringed instrument 106 in any way. The electromagnetic pickup 102 has a magnetic field. The output connector 104 is configured to provide an electrical signal indicative of the movement of a string 108 of the stringed instrument 106 within the magnetic field of the electromagnetic pickup 102. That is, the magnetic field of the electromagnetic pickup 102 extends with sufficient magnitude to approximately 6 inches from the electromagnetic pickup 102. When the string 108 of the stringed instrument 106 vibrates or resonates within the magnetic field, the electromagnetic pickup provides the electrical signal indicative of the movement, and the signals transferred to the output connector 104. It is contemplated that the electrical signal may be modified such as by, for example, amplifying the electrical signal before providing it to the output connector 104. The string 108 of the stringed instrument 106 should include or have attached thereto and metal such that movement (e.g., resonance after being plucked, picked, or strummed) within the magnetic field of the electromagnetic pickup 102 will induce electric currents in the electromagnetic pickup 102.

In one embodiment, the electromagnetic pickup 102 is a noise canceling pickup such as a humbucker pickup. The electromagnetic pickup 102 provides electrical signal to the output connector 104 as a function of the movement of the string 108 of the stringed instrument 106 within the magnetic field of the electromagnetic pickup 102. That is, in one embodiment, the electrical signal provided at the output connector 104 includes all movement and harmonics of the string 108, not just the resonant frequency of the string 108.

In one embodiment, the tuning device 100 includes a housing 130 and a mount 110. The housing 130 is configured to support the electromagnetic pickup 102, the output connector 104, and optionally, any other components of the tuning device 100 described hereinafter (e.g., switches, indicator lights, headphone jacks, and volume knobs). The mount 110 is configured to attach to the housing 130 and to clamp onto a pole 120. The pole 120 may be, for example, the pole 120 for the neck support of a stand for a stringed instrument or a pole of a microphone stand or music stand.

Figure 3:
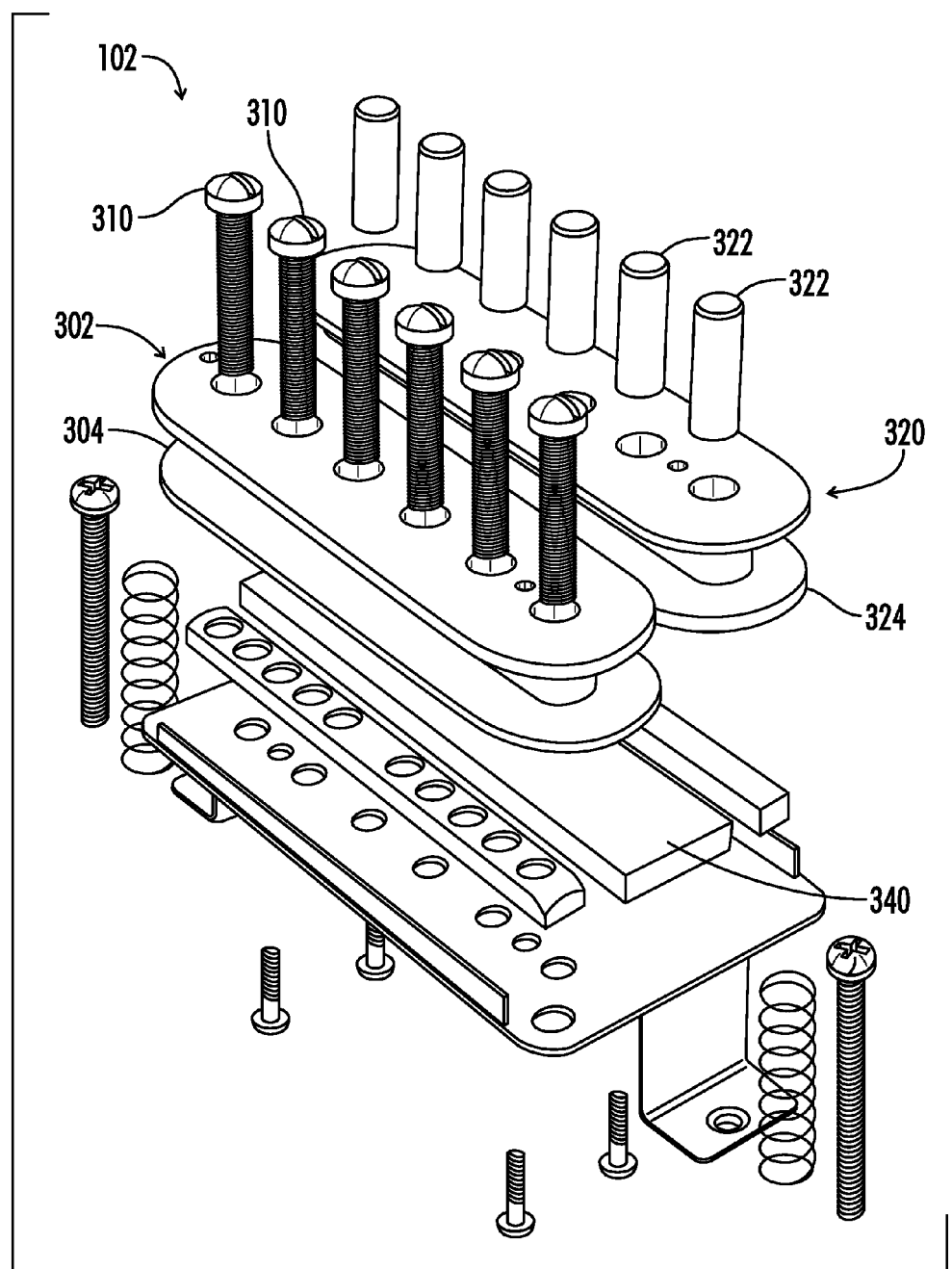
FIG. 3 is an exploded diagram of an electromagnetic pickup of a tuning device.
Figure 4:
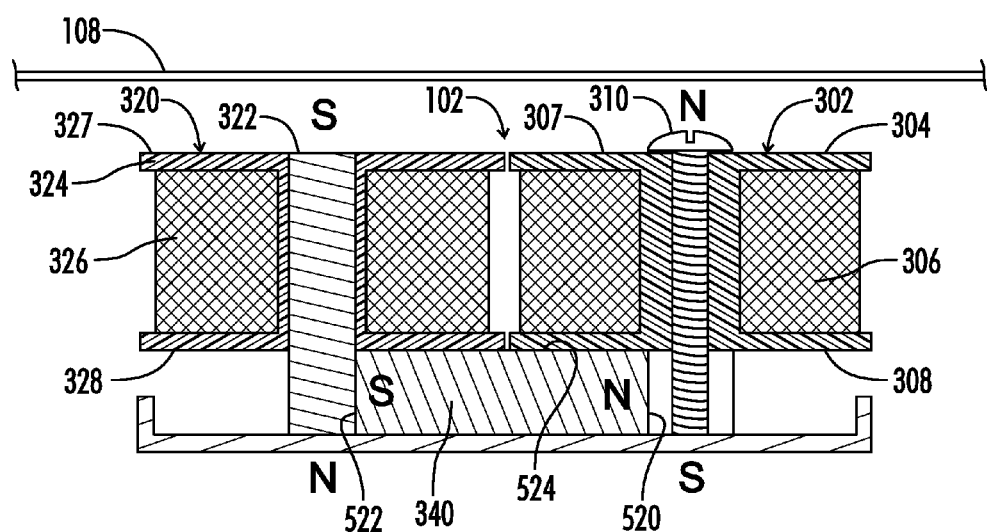
FIG. 4 is a cross section of the electromagnetic pickup of FIG. 3.
Figure 5:
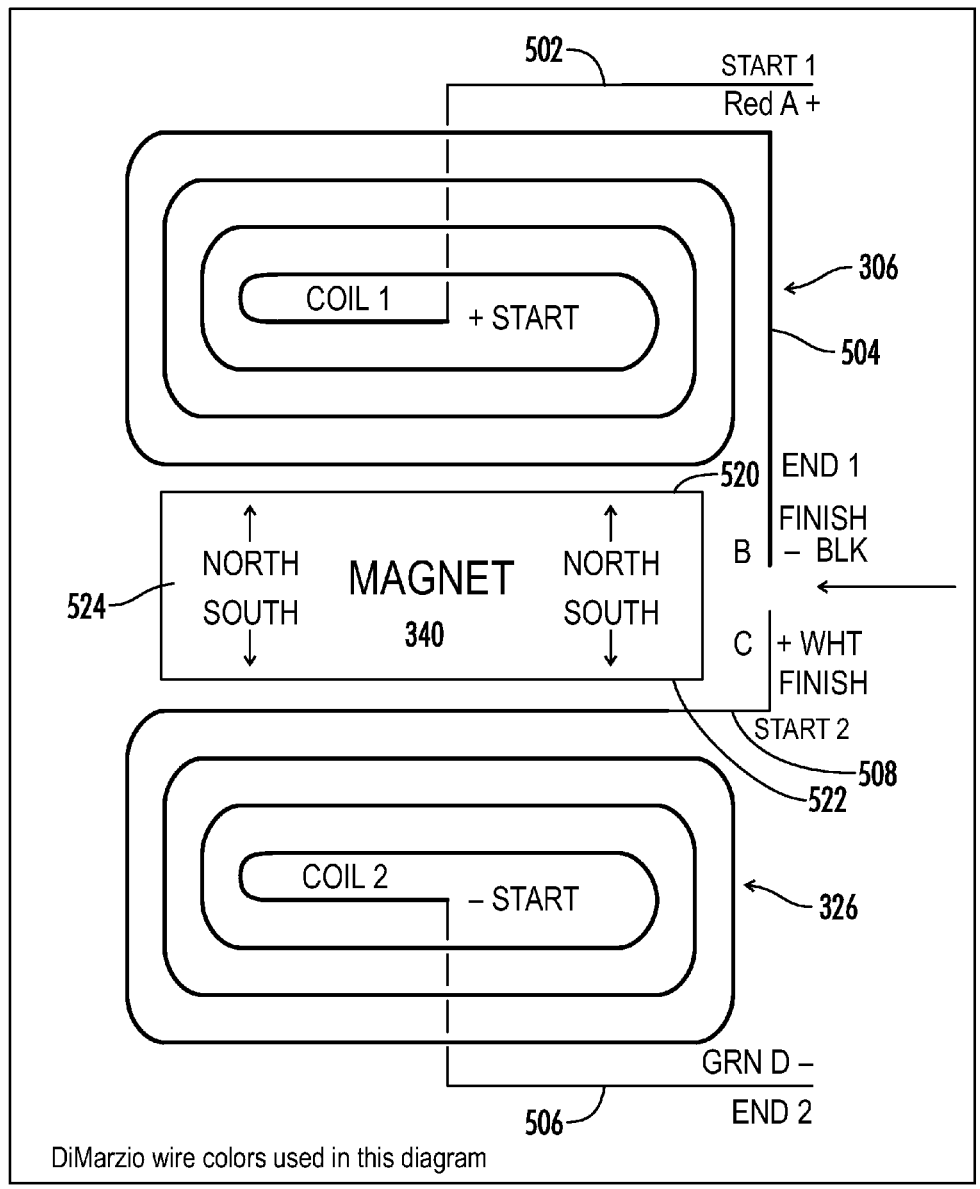
FIG. 5 is a schematic diagram of the electromagnetic characteristics of the electromagnetic pickup of FIG. 3.

Referring to FIGS. 3-5, the electromagnetic pickup 102 includes a first coil 302, a second coil 320, the magnets 340 a first pole piece 310, and a second pole piece 322. The first coil 302 includes a first bobbin 304 and a first winding 306. The first winding 306 is wound in a first direction (e.g., clockwise) around the first bobbin 304. The first coil 302 has a start lead 502 connected to the beginning of the first winding 306 and in the lead 504 connected to the end of the first winding 306. The first coil 302 has a top 307 and the bottom 308.

The second coil includes a second bobbin 324 and a second winding 326. The second winding 326 is wound in the first direction (e.g., clockwise) around the second bobbin 324. The second coil 320 has a start lead 506 connected to the beginning of the second winding 326 and and in the lead 508 connected to the end of the second winding 326. The second coil 320 has a top 327 and a bottom 328.

The magnet 340 has a first magnetic pole emanating from a first face 520 of the magnet 340 and a second magnetic pole emanating from the second face 522 of the magnet 340. The first magnetic pole is opposite the second magnetic pole, and the first face 520 is opposite the second face 522. The magnet 340 has a third face 524 connecting the first face 520 to the second face 522.

The first pole piece 310 extends from the top 307 of the first coil 302 to the bottom 308 of the first coil 302. The first pole piece 310 is positioned adjacent the first face 520 of the magnet 340 is the first pole piece 310 extends beyond the bottom 308 of the first coil 302. The second pole piece 322 extends from the top 327 of the second coil 320 to the bottom 328 of the second coil 320. The second pole piece 322 is positioned adjacent the second face 522 of the magnet 340 as the second pole piece 322 extends beyond the bottom 328 of the second coil 320. In one embodiment, the bottom 308 of the first bobbin 304 forms the bottom of the first coil 302, and the first bobbin 304 is positioned adjacent the third face 524 of the magnet 340. Additionally, the bottom 328 of the second bobbin 324 forms the bottom of the second coil 320 and the second bobbin 324 is positioned adjacent the third face 524 of the magnet 340 (e.g., the bottom 308 of the first bobbin 304 and the bottom 328 of the second bobbin 324 rest on the third face 524 of the magnet 340).

A standard humbucker pickup has 5000 turns on each winding. In one embodiment, the first winding 306 and the second winding 326 each have approximately 5500 turns. The 10% increase in turns provides a focused magnetic field that extends outward from the tops of the first and second coils further and in a more focused direction (i.e., having a cross-section that is more elliptical than spherical). This electromagnetic pickup configuration results in a very bright sound that is generally not acceptable for use in a guitar. In one embodiment, the electromagnetic pickup 102 includes a plurality of first pole pieces 310 and a plurality of second pole pieces 322.

In another embodiment of the electromagnetic pickup 102, the electromagnetic pickup 102 includes a single first pole piece 310 having a height (i.e., top to bottom extension) approximately equivalent to that of the 6 individual first pole pieces 310 in the first coil 306 of a standard humbucker pickup and a width spanning approximately the same width as the six individual first pole pieces 310 in a standard humbucker pickup, and a single second pole piece 322 having dimensions approximately equal to those of the single first pole piece 310. Optionally, each bobbin has a slot for receiving one of the elongated metal pole pieces. In yet another embodiment of the electromagnetic pickup 102, the first coil 302 includes a first bar magnet wound with the first coil 306. The north pole of the first bar magnet forms a top surface of the first bar magnet, and the south pole of the first bar magnet forms a bottom surface of the first bar magnet. The second coil 320 includes a second bar magnet wound with the second coil 326. The south pole of the second bar magnet forms a top surface of the second bar magnet, and the north pole of the second bar magnet form a bottom surface of the second bar magnet. The tops and bottoms of the first and second bar magnets are substantially vertically aligned when the electromagnetic pickup 102 is in a position with the tops of the first and second bar magnets facing up and the bottoms of the first and second bar magnets facing down. The first and second bar magnets have substantially similar magnetic strength and size, and the first coil 306 and second coil 326 have substantially similar numbers of turns. The number of turns on one of the first or second bar magnets may vary from the other to compensate for variances in magnetic strength of the magnets. Optionally, each bobbin has a slot for receiving one of the bar magnets. These alternative embodiments of the electromagnetic pickup 102 are generally not suitable for musical production due to their sonic characteristics. However, these embodiments of the electromagnetic pickup 102 project a strong magnetic field directly outward from the tops of the first and second coils which gives the electromagnetic pickup 102 a focused magnetic field with a large extension from the tops of the first and second coils such that the instrument 106 and string 108 may be held farther from the tuning device 100 while verifying the tuning of the string 108.

Figure 6:
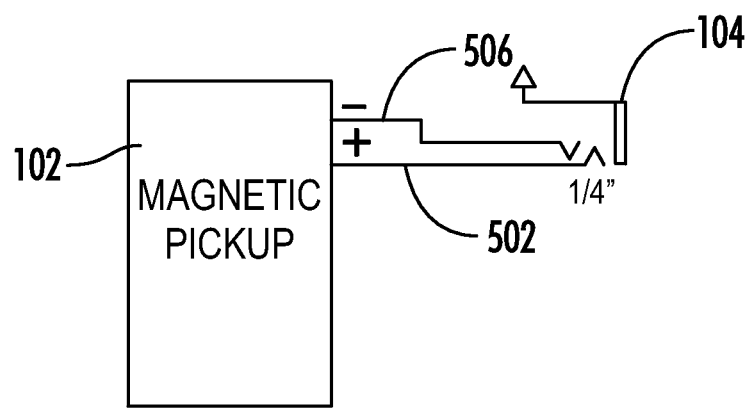
FIG. 6 is a schematic wiring diagram of a tuning device for a stringed instrument.

Referring to FIGS. 5 and 6, in one embodiment, the start lead 508 of the second coil 326 is connected to the end the lead 504 of the first coil 306. The end lead 506 of the second coil 326 and the start lead 502 of the first coil 306 are connected to the output connector 104 to provide the electrical signal indicative of the movement of the string 108 of the stringed instrument 106 within the magnetic field of the electromagnetic pickup 102. In this way, the first coil 306 and second coil 326 are wired electrically out of phase to reject radio frequency noise (e.g., 60 Hertz power line hum) and magnetically in phase to provide the electrical signal indicative of the movement of the string 108 within the magnetic field emanating from the electromagnetic pickup 102.

Figure 7:
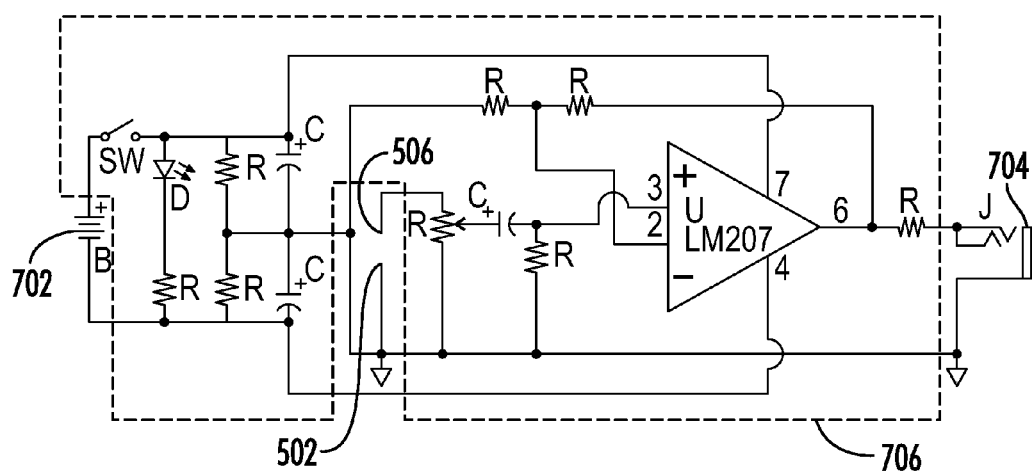
FIG. 7 is a schematic diagram of a headphone amplifier of a tuning device.
Figure 8:
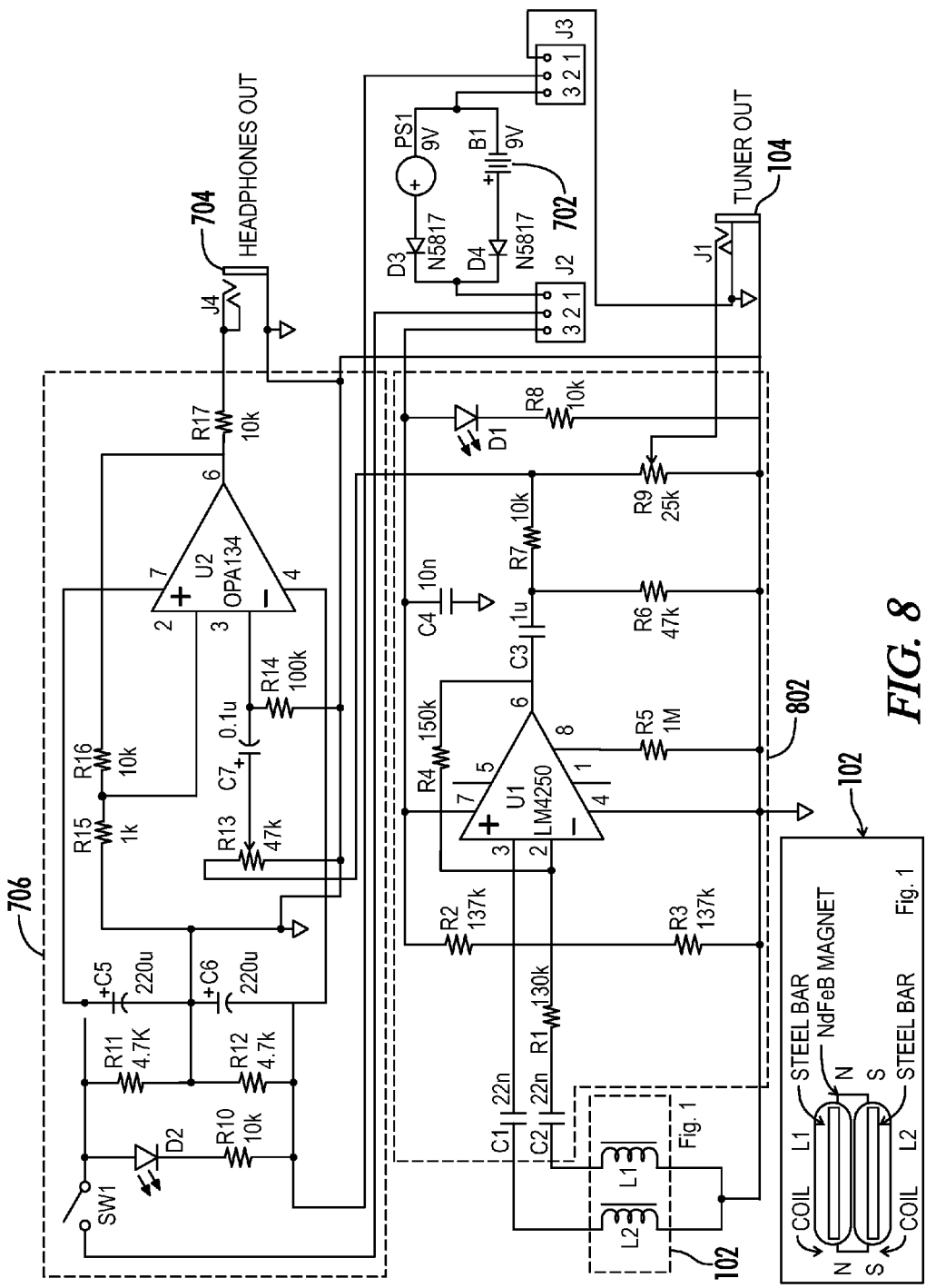
FIG. 8 is a schematic diagram of a tuning device including a headphone amplifier and an amplified output.

Referring to FIGS. 7 and 8, in one embodiment, the tuning device 100 further includes a power supply 702 and a headphone amplifier 706. The headphone amplifier 706 is configured to receive power from the power supply 702 and the electrical signal indicative of the movement of the string 108 within the magnetic field of the electromagnetic pickup 102 from the electromagnetic pickup 102. The headphone amplifier 706 provides a corresponding amplified signal to a headphone output 704 of the tuning device 102.

Referring to FIG. 8, in one embodiment, the electromagnetic pickup 102 is configured for differential amplification. A differential amplifier 802 receives the electrical signal from the electromagnetic pickup 102, amplifies the differential signal, and provides the amplified differential signal to the output connector 104.

Figure 9:
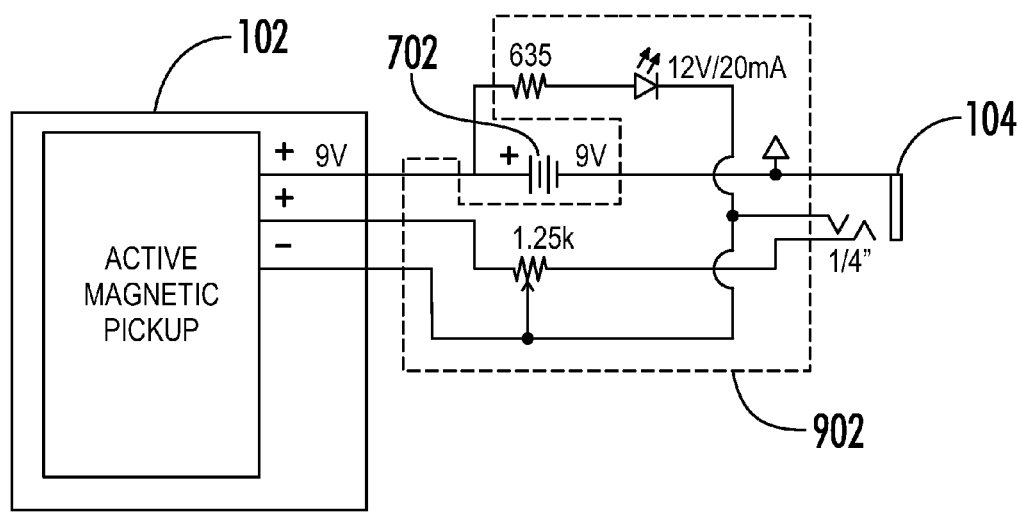
FIG. 9 is a schematic diagram of a tuning device including an active electromagnetic pickup.

Referring to FIG. 9, in one embodiment, the electromagnetic pickup 102 is an active magnetic pickup. An active magnetic pickup requires a power supply 702 in order to operate. In this embodiment, the tuning device 102 further includes the power supply 702 and a circuit 902 configured to provide the power from the power supply 702 to the electromagnetic pickup 102 and provide the electrical signal indicative of the movement of the string within the magnetic field from the electromagnetic pickup 102 to the output connector 104.

Figure 10:
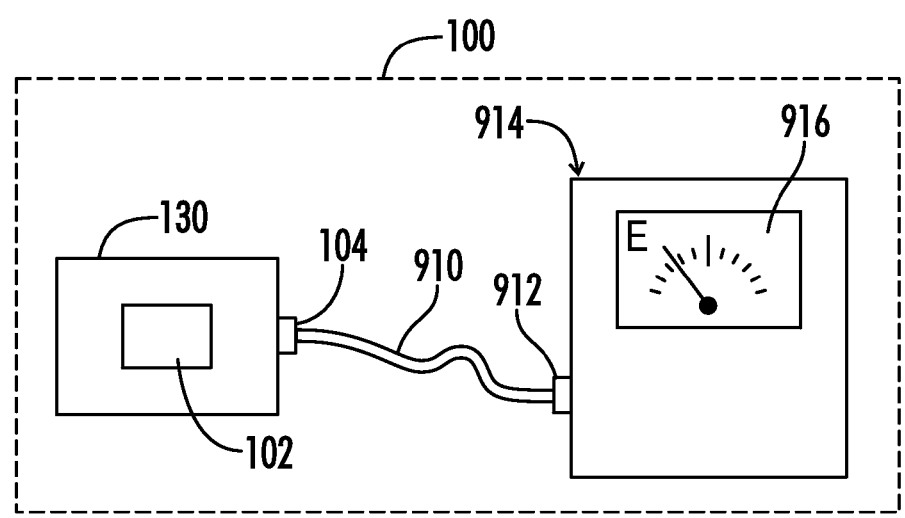
FIG. 10 is a diagram of a tuning device including an electronic tuner.

Referring to FIG. 10, in one embodiment, the tuning device 100 further includes an electronic tuner 914. The electronic tuner includes an input connector 912 and a display 916. The input connector 912 is configured to connect to the output connector 104 via an electrical cable 910 and receive the electrical signal from the output connector 104 via the electrical cable 910. The display 916 of the electronic tuner 914 is configured to provide a visual indicator of a frequency of the received electrical signal.

Figure 11:
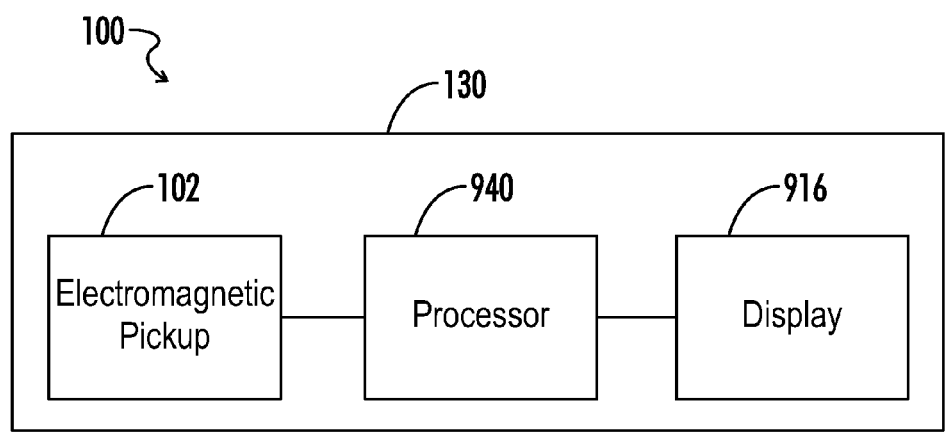
FIG. 11 is a diagram of a tuning device having an integral electronic tuner including a display.

Referring to FIG. 11, in one embodiment, the tuning device 100 includes the electromagnetic pickup 102, a processor 940, and the display 916. The electromagnetic pickup 102 is separate from the stringed instrument 106, and the electromagnetic pickup as a magnetic field. The electromagnetic pickup 102 is configured to provide an electrical signal indicative of the movement of the string 108 of the stringed instrument 106 within the magnetic field. The processor 940 is configured to receive the electrical signal provided by the electromagnetic pickup 102, determine a frequency of the electrical signal, and provide the frequency of the electrical signal. The display 916 is configured to receive the frequency of the electrical signal from the processor 940 and provide a visual indicator of the frequency of electrical signal.

In one embodiment, a method of verifying a tuning of a stringed instrument 106 includes positioning the stringed instrument 106 such that a string 108 of the stringed instrument 106 is within 6 inches of the electromagnetic pickup 102 of the tuning device 100. The electromagnetic pickup 102 is not physically attached to the stringed instrument 106 other than by magnetic coupling through the magnetic field of the electromagnetic pickup 102. The method continues with picking the string 108 of the string instrument 106. In this context, picking means strumming, plucking, picking, or moving the string 108 in anyways such as to cause it to resonate. The visual indicator of a frequency of the string 108 is then read from the display 916 associated with the tuning device 100. Optionally, the method may further include mounting the tuning device 100 to a pole 120 of a microphone stand, music stand, or guitar stand via a mount 110. The method may also include connecting an output connector 104 of the tuning device 100 to the input connector 912 of an electronic tuner 914 via an electrical cable 910 such that the output connector 104 provides electrical signal indicative of the movement of the string 108 within the magnetic field of the electromagnetic pickup 102 to the tuning device 914 when the display 916 associated with the tuning device 100 is the display of the electronic tuner 914.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although embodiments of the present invention have been described in detail, it will be understood by those skilled in the art that various modifications can be made therein without departing from the spirit and scope of the invention as set forth in the appended claims.

A controller, processor, computing device, client computing device or computer, such as described herein, includes at least one or more processors or processing units and a system memory. The controller may also include at least some form of computer readable media. By way of example and not limitation, computer readable media may include computer storage media and communication media. Computer readable storage media may include volatile and nonvolatile, removable and non-removable media implemented in any method or technology that enables storage of information, such as computer readable instructions, data structures, program modules, or other data. Communication media may embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media. As used herein, server is not intended to refer to a single computer or computing device. In implementation, a server will generally include an edge server, a plurality of data servers, a storage database (e.g., a large scale RAID array), and various networking components. It is contemplated that these devices or functions may also be implemented in virtual machines and spread across multiple physical computing devices.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Thus, although there have been described particular embodiments of the present invention of a new and useful MAGENTIC RESONANCE TUNING DEVICE FOR STRINGED INSTRUMENTS it is not intended that such references be construed as limitations upon the scope of this invention except as set forth in the following claims.

What is claimed is:
1. A tuning device for a stringed instrument, said tuning device comprising:
   an electromagnetic pickup separate from the stringed instrument, wherein the electromagnetic pickup has a magnetic field; and
   an output connector configured to provide an electrical signal indicative of a movement of a string of the stringed instrument within the magnetic field of the electromagnetic pickup;
   a first coil comprising a first bobbin and a first winding wound in a first direction around the first bobbin, said first coil having a start lead connected to a beginning of the first winding and an end lead connected to an ending of the first winding, wherein the first coil has a top and a bottom;

a second coil comprising a second bobbin and a second winding wound in the first direction around the second bobbin, said second coil having a start lead connected to a beginning of the second winding and an end lead connected to an ending of the second winding, wherein the second coil has a top and a bottom;

a magnet having a first magnetic pole emanating from a first face of the magnet and a second magnetic pole emanating from a second face of the magnet, wherein the first magnetic pole is opposite the second magnetic pole, the first face is opposite the second face, and the magnet has a third face connecting the first face to the second face;

a first pole piece extending from the top of the first coil to the bottom of the first coil, wherein the first pole piece is positioned adjacent the first face of the magnet as the first pole piece extends beyond the bottom of the first coil; and a second pole piece extending from the top of the second coil to the bottom of the second coil, wherein the second pole piece is positioned adjacent the second face of the magnet as the second pole piece extends beyond the bottom of the second coil.

2. The tuning device of claim 1, wherein:
the electromagnetic pickup is a noise cancelling pickup; and
the electromagnetic pickup provides the electrical signal to the output connector as a function of the movement of the string of the stringed instrument within the magnetic field of the electromagnetic pickup.

3. The tuning device of claim 1, wherein:
the electromagnetic pickup is a humbucker pickup.

4. The tuning device of claim 1,
wherein the first coil winding and the second coil winding each have at least 5500 turns.

5. The tuning device of claim 1, wherein the electromagnetic pickup comprises:
a plurality of first pole pieces extending from the top of the first coil to the bottom of the first coil, wherein each first pole piece of the plurality of first pole pieces is positioned adjacent the first face of the magnet as said first pole piece extends beyond the bottom of the first coil; and
a plurality of second pole pieces extending from the top of the second coil to the bottom of the second coil, wherein each second pole piece of the plurality of second pole pieces is positioned adjacent the second face of the magnet as said second pole piece extends beyond the bottom of the second coil.

6. The tuning device of claim 1,
wherein:
the start lead of the second coil is connected to the end lead of the first coil; and
the end lead of the second coil and the start lead of the first coil are connected to the output connector to provide the electrical signal indicative of the movement of the string of the stringed instrument within the magnetic field of the electromagnetic pickup.

7. The tuning device of claim 1,
wherein:
the first bobbin forms the bottom of first coil and the first bobbin is positioned adjacent the third face of the magnet; and the second bobbin forms the bottom of the second coil and the second bobbin is positioned adjacent the third face of the magnet.

8. The tuning device of claim 1, further comprising:
a power supply;
a headphone amplifier configured to receive power from the power supply and the electrical signal indicative of the movement of the string from the electromagnetic pickup and provide a corresponding amplified signal to a headphone output of the tuning device.

9. The tuning device of claim 1, further comprising a power supply, wherein the electromagnetic pickup is an active pickup configured to receive power from the power supply.

10. The tuning device of claim 1, further comprising:
a housing configured to support the electromagnetic pickup and the output connector; and
a mount configured to attach to the housing and to clamp onto a pole.

11. The tuning device of claim 1, further comprising an electronic tuner having:
an input connector configured to connect to the output connector via an electrical cable and receive the electrical signal from the output connector via the electrical cable; and
a display configured to provide a visual indicator of a frequency of the electrical signal.

12. A tuning device for a stringed instrument, said tuning device comprising:
an electromagnetic pickup separate from the stringed instrument, wherein the electromagnetic pickup has a magnetic field and is configured to provide an electrical signal indicative of a movement of a string of the stringed instrument within the magnetic field;
a processor configured to receive the electrical signal provided by the electromagnetic pickup, determine a frequency of the electrical signal, and provide the frequency of the electrical signal; and
a display configured to receive the frequency of the electrical signal from the processor and provide a visual indicator of the frequency of the electrical signal;
a first coil comprising a first bobbin and a first winding wound in a first direction around the first bobbin, said first coil having a start lead connected to a beginning of the first winding and an end lead connected to an ending of the first winding, wherein the first coil has a top and a bottom;
a second coil comprising a second bobbin and a second winding wound in the first direction around the second bobbin, said second coil having a start lead connected to a beginning of the second winding and an end lead connected to an ending of the second winding, wherein the second coil has a top and a bottom;
a magnet having a first magnetic pole emanating from a first face of the magnet and a second magnetic pole emanating from a second face of the magnet, wherein the first magnetic pole is opposite the second magnetic pole, the first face is opposite the second face, and the magnet has a third face connecting the first face to the second face;
a first pole piece extending from the top of the first coil to the bottom of the first coil, wherein the first pole piece is positioned adjacent the first face of the magnet as the first pole piece extends beyond the bottom of the first coil; and
a second pole piece extending from the top of the second coil to the bottom of the second coil, wherein the second pole piece is positioned adjacent the second face of the magnet as the second pole piece extends beyond the bottom of the second coil.

13. The tuning device of claim 12, wherein:
   the start lead of the second coil is connected to the end lead of the first coil; and
   the end lead of the second coil and the start lead of the first coil are connected to the output connector to provide the electrical signal indicative of the movement of the string of the stringed instrument within the magnetic field of the electromagnetic pickup.

14. The tuning device of claim 12, wherein:
   the first bobbin forms the bottom of first coil and the first bobbin is positioned adjacent the third face of the magnet; and
   the second bobbin forms the bottom of the second coil and the second bobbin is positioned adjacent the third face of the magnet.

15. The tuning device of claim 12, further comprising:
   a housing configured to support the electromagnetic pickup, the processor, and the display; and
   a mount configured to attach to the housing and to clamp onto a pole.

16. A method of verifying a tuning of a string instrument, said method comprising:
   positioning the stringed instrument such that a string of the stringed instrument is within six inches of an electromagnetic pickup of a tuning device, wherein the electromagnetic pickup is not attached to the stringed instrument;
   picking the string of the stringed instrument; and
   reading a visual indictor of a frequency of the string from a display associated with the tuning device;
   mounting the tuning device to a pole of a microphone stand, music stand, or guitar stand via a mount; and
   connecting an output connector of the tuning device to an input connector of an electronic tuner via an electrical cable such that the output connector provides an electrical signal indicative of a movement of the string within a magnetic field of the electromagnetic pickup,
   wherein the display associated with the tuning device is the display of the electronic tuner.

17. The method of claim 16, further comprising:
   mounting the tuning device to a pole of a microphone stand, music stand, or guitar stand via a mount;
   wherein:
   the electromagnetic pickup of the tuning device has a magnetic field and is configured to provide an electrical signal indicative of a movement of the string of the stringed instrument within the magnetic field;
   the tuning device has a processor configured to receive the electrical signal provided by the electromagnetic pickup and determine the frequency of the electrical signal and provide the frequency of the electrical signal; and
   the display of the tuning device is configured to receive the frequency of the electrical signal from the processor and display the visual indicator of the frequency of the electrical signal.

* * * * *